US012630082B2

(12) United States Patent
Baudu et al.

(10) Patent No.: US 12,630,082 B2
(45) Date of Patent: May 19, 2026

(54) METHOD FOR DETECTING A ROTATION OF PART OF THE TRUNK OF AN OCCUPANT SEATED ON A SEAT

(71) Applicant: FAURECIA Sièges d'Automobile, Nanterre (FR)

(72) Inventors: Samuel Baudu, Boulogne Billancourt (FR); Mamadou Balde, Morigny-Champigny (FR); Stéphane Le Roux, Lardy (FR); Mohamed Rouchou, Juvisy sur Orges (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 343 days.

(21) Appl. No.: 17/677,211

(22) Filed: Feb. 22, 2022

(65) Prior Publication Data

US 2022/0266724 A1 Aug. 25, 2022

(30) Foreign Application Priority Data

Feb. 23, 2021 (FR) ...................................... 2101745

(51) Int. Cl.
*B60N 2/00* (2006.01)
*B60N 2/02* (2006.01)
(Continued)

(52) U.S. Cl.
CPC ............. *B60Q 9/00* (2013.01); *B60N 2/0273* (2023.08); *B60R 21/01532* (2014.10);
(Continued)

(58) Field of Classification Search
CPC .................. B60N 2/0244; B60N 2/002; B60N 2002/981; B60N 2/0268; B60R 21/01532; B60Q 9/00
(Continued)

(56) References Cited

U.S. PATENT DOCUMENTS

| | | | |
|---|---|---|---|
| 6,442,464 B2 | 8/2002 | Eisenmann | |
| 7,162,344 B2 | 1/2007 | Kojima | |

(Continued)

FOREIGN PATENT DOCUMENTS

| | | |
|---|---|---|
| DE | 4237072 C1 | 12/1993 |
| DE | 102008044903 A1 | 3/2010 |

(Continued)

OTHER PUBLICATIONS

French Preliminary Search Report for French App. No. FR2101745 dated Nov. 15, 2021, 9 pages, No English Translation Available.

*Primary Examiner* — Helal A Algahaim
*Assistant Examiner* — Michael T Dowling
(74) *Attorney, Agent, or Firm* — Barnes & Thornburg LLP

(57) ABSTRACT

A method for detecting a rotation of part of the trunk of an occupant seated on a seat of a vehicle. The method includes: triggering a measurement of capacitance values; successively determining, from the measured capacitance values, a first stationary posture of the occupant during a first stationary period, a movement of part of the trunk of the occupant, and a second stationary posture of the occupant during a second stationary period; and calculating, for each capacitive sensor, the variation between the capacitance values measured during the first stationary period and the capacitance values measured during the second stationary period. If the variation calculated for the capacitive sensors is within ranges of capacitance values defined for the capacitive sensors, generating a detection signal.

12 Claims, 3 Drawing Sheets

(51) Int. Cl.
  *B60Q 9/00*     (2006.01)
  *B60R 21/015*    (2006.01)
  *B60N 2/90*     (2018.01)

(52) U.S. Cl.
  CPC ...... *B60N 2/0268* (2023.08); *B60N 2002/981* (2018.02); *B60N 2210/12* (2023.08)

(58) Field of Classification Search
  USPC ........................................................ 701/49
  See application file for complete search history.

(56) References Cited

U.S. PATENT DOCUMENTS

| | | |
|---|---|---|
| 7,509,838 B2 | 3/2009 | Paukkunen |
| 9,987,962 B1 * | 6/2018 | Salter ........................ B60N 2/90 |
| 11,357,290 B2 | 6/2022 | Walker |
| 2009/0128511 A1 * | 5/2009 | Sinclair ................ G06F 3/0202 |
| | | 345/174 |
| 2010/0145580 A1 * | 6/2010 | Satz ................. B60R 21/01532 |
| | | 702/65 |
| 2021/0078447 A1 * | 3/2021 | Lin ....................... B60R 21/015 |

FOREIGN PATENT DOCUMENTS

| | | |
|---|---|---|
| EP | 1129893 A2 | 9/2001 |
| EP | 1533193 B1 | 5/2005 |
| EP | 1685431 B1 | 1/2007 |
| EP | 3429406 A1 | 1/2019 |
| WO | 2017160865 A1 | 9/2017 |

* cited by examiner

METHOD FOR DETECTING A ROTATION OF PART OF THE TRUNK OF AN OCCUPANT SEATED ON A SEAT

PRIORITY CLAIM

This application claims priority to French Patent Application No. FR2101745, filed Feb. 23, 2021, which is expressly incorporated by reference herein.

BACKGROUND

The present disclosure relates to a method for detecting a rotation of part of the trunk of an occupant seated on a seat, for example a seat of a motor vehicle.

SUMMARY

According to the present disclosure, a method for detecting a rotation of at least part of the trunk of an occupant seated on a seat of a vehicle, for example a motor vehicle, the method being implemented by a detection system. The detection system may comprise a seat, at least two interdigital capacitive sensors carried by the seat, and a controller connected to the interdigital capacitive sensors, the controller comprising a memory containing at least one range of variation of capacitance values that is defined for at least one interdigital capacitive sensor; the method comprising a step of triggering a measurement phase comprising periods during which capacitance values are measured by the capacitive sensors; the method further comprising the following steps implemented by the controller during the measurement phase:

successively determining, from the measured capacitance values, a first stationary posture of the occupant during a first stationary period, a movement of at least part of the trunk of the occupant, and a second stationary posture of the occupant during a second stationary period, calculating, for each capacitive sensor, the variation between a value representative of the capacitance values measured during the first stationary period and a value representative of the capacitance values measured during the second stationary period, if the variation calculated for the at least two capacitive sensors is within the ranges of capacitance values defined for the capacitive sensors, generating a detection signal.

The features set forth in the following paragraphs may optionally be implemented. They may be implemented independently of one another or combined with one another:

The value representative of the measured capacitance values is the average value of the measured capacitance values.

In illustrative embodiments, the step of determining a stationary posture comprises the following steps:

for each capacitive sensor, calculating a maximum threshold and a minimum threshold based on the capacitance values measured during a previous period, for each capacitive sensor, comparing the capacitance values measured during a following period with the maximum threshold and with the minimum threshold;

if the capacitance values are between the maximum threshold and the minimum threshold for the set of capacitive sensors, for a duration greater than one and a half seconds, then a stationary posture is determined.

In illustrative embodiments, the step of determining comprises a step of calculating the average of the capacitance values measured during the previous period for each capacitive sensor; the maximum threshold and/or the minimum threshold being calculated by adding and/or subtracting at least 2500 picofarads, and preferably 3000 picofarads, to/from the average value calculated from the capacitance values measured during the previous period.

In illustrative embodiments, the second stationary period takes place at least two minutes, and preferably three minutes, after the first stationary period.

In illustrative embodiments, the seat comprises a backrest extending in a longitudinal direction and transverse direction, and a seating portion having a rear part adjacent to the backrest; a first capacitive sensor being positioned in a transversely central area of the backrest, a second capacitive sensor being positioned in a side area of the rear part of the seating portion, and wherein if the variation calculated for the first capacitive sensor is greater than 7500 picofarads and if the variation calculated for the second capacitive sensor is greater than 7500 picofarads, the detection signal is representative of a rotation of the pelvis of the occupant.

In illustrative embodiments, the seat comprises a backrest extending in a longitudinal direction and transverse direction and a seating portion having a rear part adjacent to the backrest, a first capacitive sensor being positioned in a lower side area of the backrest, a second capacitive sensor being positioned in a transversely central area of the backrest, a third capacitive sensor being positioned in a side area of the rear part of the seating portion, and wherein if the variation calculated for the first capacitive sensor is greater than 4500 picofarads or is between −3000 picofarads and +3000 picofarads, if the variation calculated for the second capacitive sensor is greater than 7500 picofarads and if the variation calculated for the third capacitive sensor is between −3000 picofarads and +3000 picofarads, the detection signal is representative of a rotation of the pelvis of the occupant.

In illustrative embodiments, the detection signal is generated only if the capacitance values measured during the second stationary period are between the maximum threshold and the minimum threshold for a duration of at least ten seconds.

In illustrative embodiments, the seat comprises a backrest and a seating portion having a rear part adjacent to the backrest and a front part, a first capacitive sensor being positioned in a lower side area of the backrest, a second capacitive sensor being positioned in an upper side area of the backrest, a third capacitive sensor being positioned in a side area of the rear part of the seating portion, a fourth capacitive sensor being positioned in a side area of the front part of the seating portion, and wherein if the variation calculated for the first capacitive sensor is greater than 7500 picofarads, if the variation calculated for the second capacitive sensor is greater than 12,000 picofarads, if the variation calculated for the third capacitive sensor is less than −3500 picofarads, and if the variation calculated for the fourth capacitive sensor is less than 3000 picofarads, then the detection signal is representative of a rotation of the chest of the occupant.

In illustrative embodiments, the detection signal is generated only if the capacitance values measured during the second stationary period are between the minimum threshold and the maximum threshold for a duration of at least three seconds.

In illustrative embodiments, the method further comprises a step of alerting the occupant of the seat by the triggering of a sound, of a display, or the generation of a vibration.

In illustrative embodiments, the seat comprises a seating portion and a backrest hinged to the seating portion about an axis extending in a transverse direction, and the movement of the trunk of the occupant is a rotational movement about an axis parallel to the transverse axis.

In illustrative embodiments, the generated detection signal is representative of at least one position of the occupant among a rotation of part of the trunk of the occupant, a rotation of the chest of the occupant, and a rotation of the pelvis of the occupant, and the method further comprises a step of transmitting the detection signal to a device for managing the triggering of an airbag, the device being able to manage the triggering of the airbag according to the position of the occupant.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
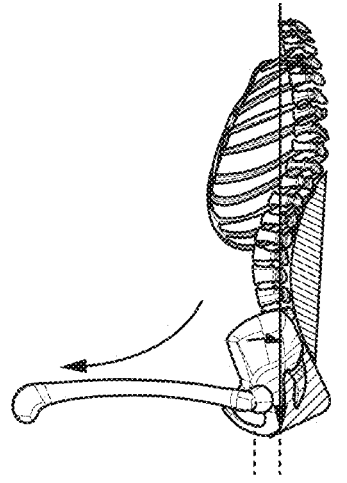
FIG. 1 is a schematic side view of a human skeleton in an ergonomic posture.
Figure 2:
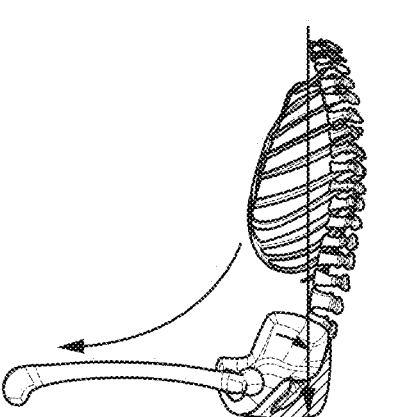
FIG. 2 is a schematic side view of a human skeleton in a posture in which the pelvis is rotated backwards.
Figure 3:
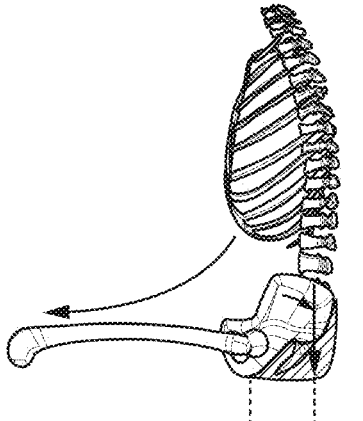
FIG. 3 is a schematic side view of a human skeleton in a posture in which the chest is rotated forward.

FIG. 1 represents a human skeleton of a person seated in an ergonomic posture that does not cause lower back pain. FIG. 2 represents a human skeleton of a person seated in a posture in which the pelvis is rotated backwards. This posture is unsuitable and can cause lower back pain. Similarly, FIG. 3 represents a human skeleton of a person seated in a posture in which the chest is rotated forward. This posture is also unsuitable and can cause lower back pain.

The detection method according to this disclosure is suitable for detecting the rotation of part of the trunk of a person seated on a seat of the detection system 2. The trunk of a person comprises the chest, the abdomen, and the pelvic girdle also called the pelvis.

Figures 4, 5:
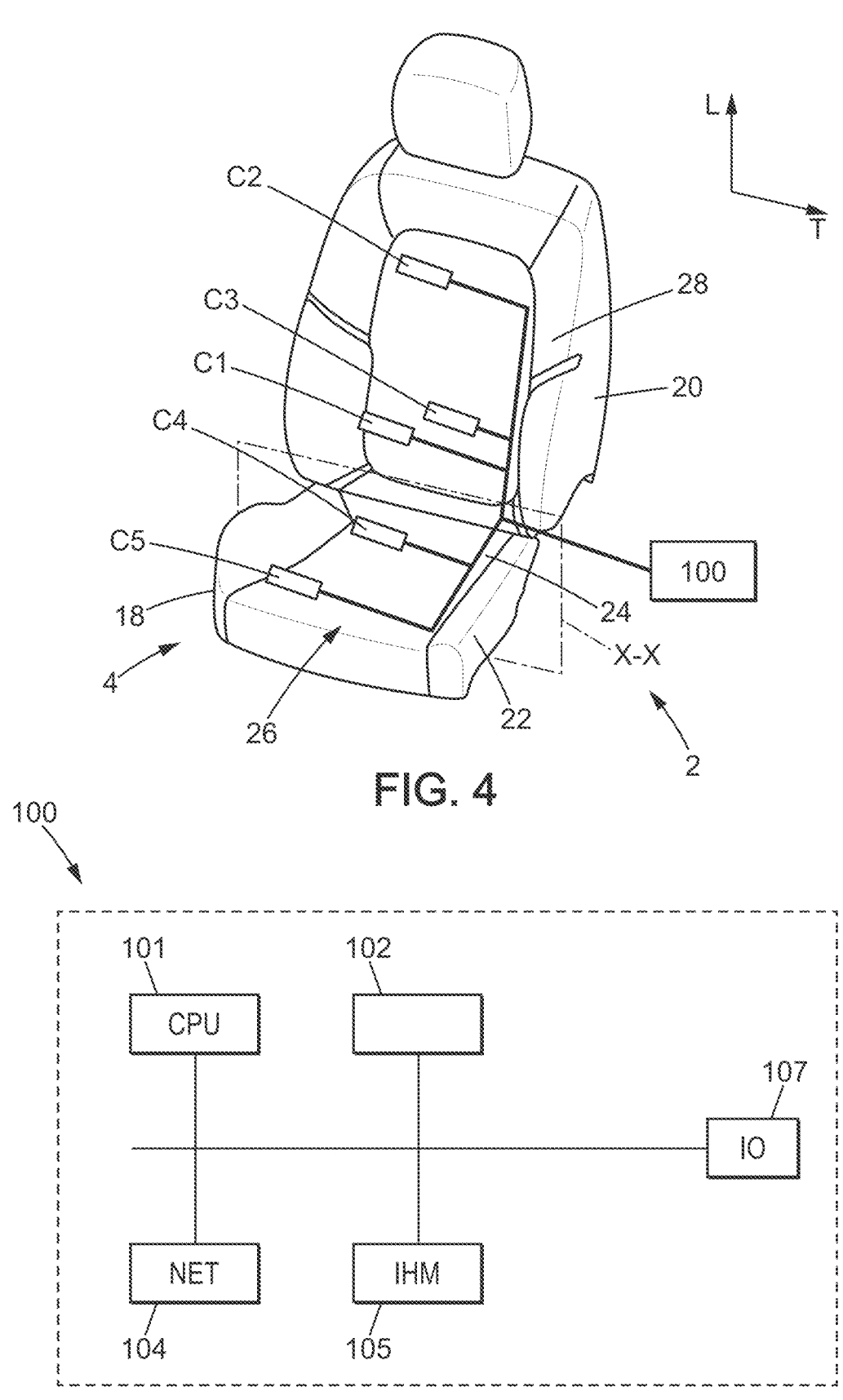
FIG. 4 is a schematic view of an example of a detection system able to implement the method according to the present disclosure.
FIG. 5 is a schematic view showing an exemplary block diagram of the controller of the detection system illustrated in FIG. 4.
Figure 6:
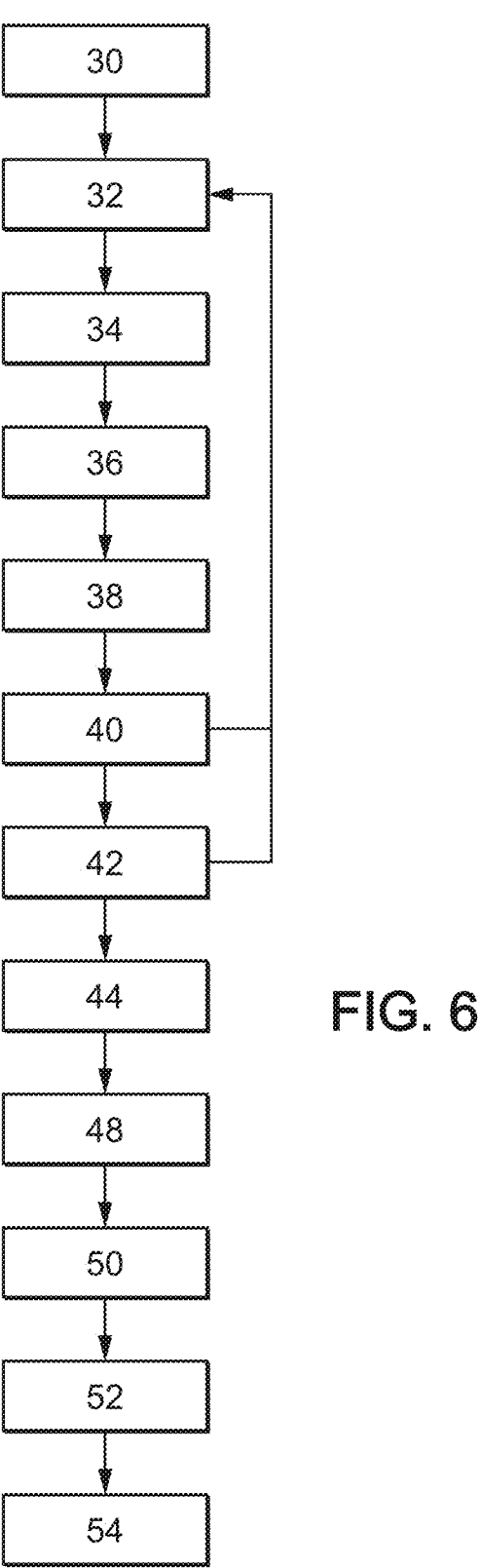
FIG. 6 is a flowchart of the steps of the detection method according to the present disclosure.

Referring to FIG. 4, the detection system 2 according to this disclosure comprises a seat 4 of a vehicle, five interdigital capacitive sensors C1, C2, C3, C4, C5 carried by the seat, and a controller 100 electrically connected to the interdigital capacitive sensors.

The vehicle may for example be a motor vehicle, a train, an airplane, or a boat.

The seat 4 comprises a seating portion 18 and a backrest 20 hinged to the seating portion around an axis extending in a transverse direction T.

In particular, the seating portion 18 comprises a receiving face 22 intended to accommodate a person or an object. For the purposes of this description, it is the that the receiving face of the seating portion is divided by a transverse central plane X-X into an area adjacent to the backrest, called the "rear part" 24, and an area located on the side opposite to the backrest, referred to as the "front part" 26.

The backrest 20 also comprises a receiving face 28 capable of receiving the back of a person. The backrest extends in a longitudinal direction L and in a transverse direction T. In this disclosure, the backrest, and in particular the receiving face 28 of the backrest, carries three interdigital capacitive sensors of the detection system. FIG. 4 shows an advantageous example of the positioning of the interdigital capacitive sensors. This positioning was chosen by taking into account the areas of support for a person seated on the seat.

An interdigital capacitive sensor C1 is located in a lower side area of the backrest. Interdigital capacitive sensor C1 is located at a position on the receiving face of the backrest which corresponds to an area of support for the gluteus medius of the person. An interdigital capacitive sensor C2 is arranged in an upper side area of the backrest. Thus, interdigital capacitive sensor C2 is located at a position of the backrest which corresponds to an area of support for a shoulderblade of the person seated on the seat and leaning against the backrest.

An interdigital capacitive sensor C3 is located in an area that is lower or central in the longitudinal direction L, and central in the transverse direction T. Interdigital capacitive sensor C3 is located at a position of the backrest which corresponds to an area of support for the lumbar vertebrae of the person.

Interdigital capacitive sensor C3 is located vertically between interdigital capacitive sensor C2 and interdigital capacitive sensor C1. Interdigital capacitive sensor C3 is always located below interdigital sensor C2.

The seating portion carries two interdigital capacitive sensors of the detection system.

An interdigital capacitive sensor C4 is located in a side area of the rear part 24 of the seating portion. Interdigital capacitive sensor C4 is located at a position in the receiving face of the seating portion which corresponds to an area of support for a buttock of the person seated on the seat and leaning against the backrest.

An interdigital capacitive sensor C5 is located in a side area of the front part 26 of the seating portion. Interdigital capacitive sensor C5 is located at a position in the seating portion that corresponds to an area of support for a hamstring of the person.

Referring to FIG. 5, the controller 100 of the determination system comprises a communication bus connected, for example, to a central processing unit 101 such as a processor or a microprocessor and denoted CPU. The controller 100 also comprises a memory 102 and executable code making it possible to implement the detection method by means of the seat and the interdigital capacitive sensors previously described.

The controller 100 may be a programmable device that uses software, a specific integrated circuit (ASIC), or part of an engine control unit (ECU). The controller 100 may optionally comprise a network interface 104 which is normally connected to a communication network over which digital data to be processed are transmitted or received; a user interface 105 for receiving inputs from a user or for displaying information to a user, an input-output module 107, denoted 10, for receiving/sending data from or to external devices such as a hard disk, removable storage medium, or other devices.

The memory 102 comprises ranges of variation of capacitance values defined for sets of capacitive sensors and enabling detection of the rotation of part of the trunk of an occupant seated on a seat.

Thus, for example, a set comprises capacitive sensor C3 associated with a first range of variation greater than 7500 picofarads and capacitive sensor C4 associated with a first range of variation greater than 6000 picofarads. This set of capacitive sensors C3, C4 and these first ranges of variation allow detecting a rotation of the pelvis of the occupant as illustrated in FIG. 2 and as explained further below in the description of the method.

Another set comprises capacitive sensor C1 associated with a second range of variation greater than 4500 picofarads or between –3000 picofarads and +3000 picofarads, capacitive sensor C3 associated with a second range of variation greater than 7500 picofarads, and capacitive sensor C4 associated with a second range of variation greater than 4500 picofarads.

This set of capacitive sensors C1, C3, C4 and these second ranges of variation also allow detecting a rotation of the pelvis of the occupant.

The table below summarizes the capacitive sensors and the ranges of variation of capacitance values enabling detection of a backwards rotation of the pelvis.

TABLE 1

| Capacitive sensor | First range of variation of capacitance values | Second range of variation of capacitance values |
| --- | --- | --- |
| C1 | — | Greater than 4500 pF or between –3000 pF and +3000 pF |
| C3 | Greater than 7500 pF | Greater than 7500 pF |
| C4 | Greater than 6000 pF | Greater than 4500 pF |

According to another example, a set comprises capacitive sensor C1 associated with a range of variation greater than 7500 picofarads, capacitive sensor C2 associated with a range of variation greater than 12,000 picofarads, capacitive sensor C4 associated with a range of variation less than –3500 picofarads, capacitive sensor C5 associated with a range of variation less than 3000 picofarads. This set of capacitive sensors C1, C2, C4, and C5 and these ranges of variation allow detecting a rotation of the pelvis of the occupant as illustrated in FIG. 3 and as explained further below in the description of the method.

TABLE 2

| Capacitive sensor | Range of variation of capacitance values |
| --- | --- |
| C1 | Greater than 7 500 pF |
| C2 | Greater than 12 000 pF |
| C4 | Less than –3500 pF |
| C5 | Less than 3000 pF |

The method for detecting a rotation of at least part of the trunk of an occupant seated on a seat begins with a step 30 of triggering a phase of capacitance value measurement by the capacitive sensors C1 to C5. The measurement phase lasts for the entire duration of the detection method. The measurement phase includes measurement periods. During each measurement period, the capacitive sensors C1 to C5 measure several capacitance values. The method comprises steps of processing the capacitance values measured in each measurement period in order to determine a first stationary posture of the occupant seated on the seat, a change in the position of the occupant to place himself in a position which can lead to back pain, and a new unmoving position called the second stationary posture.

To this end, during a step 32, an average value is calculated from the capacitance values measured for each capacitive sensor, during a period called the previous period.

Then, during a step 34, a minimum threshold and a maximum threshold are calculated for each capacitive sensor. The minimum threshold is calculated by subtracting 3000 picofarads from the average value calculated for each capacitive sensor during step 32. A maximum threshold is calculated by adding 3000 picofarads to the average value calculated for each capacitive sensor during step 32.

During a step 36, the capacitance values measured during one or more following periods are compared with the minimum threshold and with the maximum threshold, for each capacitive sensor.

When the capacitance values measured during the following period(s) for the set of capacitive sensors are between the minimum threshold and the maximum threshold for a duration at least equal to 1.5 seconds, then a first stationary posture is determined during a step 38. This stationary posture corresponds to immobility of the trunk and hamstrings of the occupant seated on the seat. The period during which the first stationary posture is determined is referred to as the first stationary period in this patent application.

The phase of capacitance value measurement continues in order to determine if the occupant of the seat changes position so as to place himself in a position that could cause back pain. Processing steps 32-36 are repeated until a movement of the occupant's trunk is determined in step 40. A movement of the occupant's trunk is determined when the capacitance values measured during of one or more following periods are higher or lower than 4000 picofarads for a duration of at least 3 seconds. The movement of the occupant's trunk is a rotational movement around an axis parallel to the transverse axis T.

Finally, steps 32 to 36 are repeated until a second stationary posture of the occupant is determined during a step 42. The period during which the second stationary posture is determined is called the second stationary period in this patent application.

During a step 44, a value representative of the capacitance values measured during the first stationary period is determined for each capacitive sensor. A value representative of the capacitance values measured during the second stationary period is also determined for each capacitive sensor. These representative values are, for example, the average values of the capacitance values measured during each stationary period.

Preferably, the detection signal is generated during a step 50 only if the capacitance values measured during the second stationary period are between the maximum threshold and the minimum threshold for a duration of at least ten seconds.

During a step 46, the variation between the average of the capacitance values measured during the first stationary period, and the average value of the capacitance values measured during the second stationary period, is calculated for the capacitive sensors C1, C3, and C4.

During a step 48, the variations calculated for the capacitive sensors C1, C3, and C4 are compared with the first and second ranges of capacitance values stored in the memory 102 and indicated in Table 1.

A pelvis rotation detection signal is generated during the step 50 if all the following conditions are met:

if the variation calculated for capacitive sensor C3 is
        greater than 7500 picofarads, and if the variation calculated for capacitive sensor C4 is greater than 6000 picofarads.

A pelvis rotation detection signal is also generated during step 50 if all the following conditions are met:

if the variation calculated for capacitive sensor C1 is greater than 4500 picofarads or if the variation calculated for capacitive sensor C1 is between −3000 picofarads and +3000 picofarads, and if the variation calculated for capacitive sensor C3 is greater than 7500 picofarads, and if the variation calculated for capacitive sensor C4 is greater than 4500 picofarads.

During step 46, the variation between the average of the capacitance values measured during the first stationary period, and the average value of the capacitance values measured during the second stationary period, is calculated for the capacitive sensors C1, C2, C4, and C5.

During step 48, the variations calculated for the capacitive sensors C1, C2, C4, and C5 are compared with the ranges of capacitance values stored in the memory 102 and indicated in Table 2.

A chest rotation detection signal is generated during a step 52 if all the following conditions are met:

if the variation calculated for the first capacitive sensor C1 is greater than 7500 picofarads, and if the variation calculated for the second capacitive sensor C2 is greater than 12,000 picofarads, and if the variation calculated for the third capacitive sensor C4 is less than −3500 picofarads, and if the variation calculated for the fourth capacitive sensor C5 is less than 3000 picofarads.

Preferably, the chest rotation detection signal is generated during step 52 only if the capacitance values measured during the second stationary period are between the minimum threshold and the maximum threshold for a duration of at least three seconds.

The detection method may also comprise a step 54 of alerting the occupant of the seat by the triggering of a sound, of a display, or the generation of a vibration.

Preferably, the method further comprises a step of transmitting a generated detection signal to a device for managing the triggering of an airbag. This signal is used by the latter to manage the triggering of the airbag according to the position of the occupant. Indeed, the generated detection signal is representative of at least one position of the occupant among a rotation of part of the trunk of the occupant, a rotation of the chest of the occupant, and a rotation of the pelvis of the occupant. The device for managing the triggering of the airbag uses this information to decide whether or not to trigger the airbag or to decide on the force of this triggering.

The present disclosure relates to a method for detecting a rotation of part of the trunk of an occupant seated on a seat, for example a seat of a motor vehicle. This method is implemented in order to monitor the sitting posture of an occupant and to prevent possible future lower back pain.

There is a growing demand for methods for monitoring and detecting unsuitable sitting postures that can ultimately lead to lower back pain. These methods are particularly in demand in the automotive field. During long car journeys, drivers often tend to slump in their seat or hunch over due to fatigue or loss of muscle tone. These postures are not ergonomic and can cause lower back pain. Comparative methods for detecting bad posture may attempt to remedy this problem, but these comparative methods are not very robust or very reliable.

The aim of the present disclosure is to propose an alternative detection method that is more robust and more reliable than comparative methods. Advantageously, this method is inexpensive.

A method for detecting a rotation of at least part of the trunk of an occupant seated on a seat of a vehicle, for example a motor vehicle, the method being implemented by a detection system comprising a seat, at least two interdigital capacitive sensors carried by the seat, and a controller connected to the interdigital capacitive sensors, the controller comprising a memory containing at least one range of variation of capacitance values that is defined for at least one interdigital capacitive sensor; the method comprising a step of triggering a measurement phase comprising periods during which capacitance values are measured by the capacitive sensors; the method further comprising the following steps implemented by the controller during the measurement phase:

successively determining, from the measured capacitance values, a first stationary posture of the occupant during a first stationary period, a movement of at least part of the trunk of the occupant, and a second stationary posture of the occupant during a second stationary period, calculating, for each capacitive sensor, the variation between a value representative of the capacitance values measured during the first stationary period and a value representative of the capacitance values measured during the second stationary period, if the variation calculated for the at least two capacitive sensors is within the ranges of capacitance values defined for the capacitive sensors, generating a detection signal.

The features set forth in the following paragraphs may optionally be implemented. They may be implemented independently of one another or combined with one another:

The value representative of the measured capacitance values is the average value of the measured capacitance values.

According to one embodiment, the step of determining a stationary posture comprises the following steps:

for each capacitive sensor, calculating a maximum threshold and a minimum threshold based on the capacitance values measured during a previous period, for each capacitive sensor, comparing the capacitance values measured during a following period with the maximum threshold and with the minimum threshold;

if the capacitance values are between the maximum threshold and the minimum threshold for the set of capacitive sensors, for a duration greater than one and a half seconds, then a stationary posture is determined.

According to one embodiment, the step of determining comprises a step of calculating the average of the capacitance values measured during the previous period for each capacitive sensor; the maximum threshold and/or the minimum threshold being calculated by adding and/or subtracting at least 2500 picofarads, and preferably 3000 picofarads, to/from the average value calculated from the capacitance values measured during the previous period.

According to one embodiment, the second stationary period takes place at least two minutes, and preferably three minutes, after the first stationary period.

According to one embodiment, the seat comprises a backrest extending in a longitudinal direction and transverse direction, and a seating portion having a rear part adjacent to the backrest; a first capacitive sensor being positioned in a transversely central area of the backrest, a second capacitive sensor being positioned in a side area of the rear part of the seating portion, and wherein if the variation calculated for the first capacitive sensor is greater than 7500 picofarads and if the variation calculated for the second capacitive sensor is greater than 7500 picofarads, the detection signal is representative of a rotation of the pelvis of the occupant.

According to one embodiment, the seat comprises a backrest extending in a longitudinal direction and transverse direction and a seating portion having a rear part adjacent to the backrest, a first capacitive sensor being positioned in a lower side area of the backrest, a second capacitive sensor being positioned in a transversely central area of the backrest, a third capacitive sensor being positioned in a side area of the rear part of the seating portion, and wherein if the variation calculated for the first capacitive sensor is greater than 4500 picofarads or is between –3000 picofarads and +3000 picofarads, if the variation calculated for the second capacitive sensor is greater than 7500 picofarads and if the variation calculated for the third capacitive sensor is between –3000 picofarads and +3000 picofarads, the detection signal is representative of a rotation of the pelvis of the occupant.

According to one embodiment, the detection signal is generated only if the capacitance values measured during the second stationary period are between the maximum threshold and the minimum threshold for a duration of at least ten seconds.

According to one embodiment, the seat comprises a backrest and a seating portion having a rear part adjacent to the backrest and a front part, a first capacitive sensor being positioned in a lower side area of the backrest, a second capacitive sensor being positioned in an upper side area of the backrest, a third capacitive sensor being positioned in a side area of the rear part of the seating portion, a fourth capacitive sensor being positioned in a side area of the front part of the seating portion, and wherein if the variation calculated for the first capacitive sensor is greater than 7500 picofarads, if the variation calculated for the second capacitive sensor is greater than 12,000 picofarads, if the variation calculated for the third capacitive sensor is less than –3500 picofarads, and if the variation calculated for the fourth capacitive sensor is less than 3000 picofarads, then the detection signal is representative of a rotation of the chest of the occupant.

According to one embodiment, the detection signal is generated only if the capacitance values measured during the second stationary period are between the minimum threshold and the maximum threshold for a duration of at least three seconds.

According to one embodiment, the method further comprises a step of alerting the occupant of the seat by the triggering of a sound, of a display, or the generation of a vibration.

According to one embodiment, the seat comprises a seating portion and a backrest hinged to the seating portion about an axis extending in a transverse direction, and the movement of the trunk of the occupant is a rotational movement about an axis parallel to the transverse axis.

According to one embodiment, the generated detection signal is representative of at least one position of the occupant among a rotation of part of the trunk of the occupant, a rotation of the chest of the occupant, and a rotation of the pelvis of the occupant, and the method further comprises a step of transmitting the detection signal to a device for managing the triggering of an airbag, the device being able to manage the triggering of the airbag according to the position of the occupant.

The present disclosure relates to a method for detecting a rotation of part of the trunk of an occupant seated on a seat of a vehicle, the method comprising the following steps:
    triggering (30) a measurement of capacitance values;
    successively determining (32,34,36,38,40,42), from the measured capacitance values, a first stationary posture of the occupant during a first stationary period, a movement of part of the trunk of the occupant, and a second stationary posture of the occupant during a second stationary period,
    calculating (44, 46), for each capacitive sensor, the variation between the capacitance values measured during the first stationary period and the capacitance values measured during the second stationary period,
    if the variation calculated for the capacitive sensors is within ranges of capacitance values defined for the capacitive sensors, generating (50) a detection signal.

The invention claimed is:

1. A method for detecting a rotation of at least part of the trunk of an occupant seated on a seat of a vehicle, the method being implemented by a detection system comprising the seat, at least a first interdigital capacitive sensor and a second interdigital capacitive sensor carried by the seat, and a controller connected to the first interdigital capacitive sensor and the second interdigital capacitive sensor, said controller comprising a memory containing at least a first range of variation of capacitance values that is defined for the first interdigital capacitive sensor and a second range of variation of capacitance values that is defined for the second interdigital capacitive sensor; the method comprising:
    triggering a measurement phase comprising periods during which capacitance values are measured by the first interdigital capacitive sensor and the second capacitive sensor; the method further comprising, during the measurement phase successively,
    determining a first stationary posture of the occupant from the measured capacitance values, the first stationary posture taking place during a first stationary period,
    determining a movement of at least part of the trunk of the occupant from the measured capacitance values, and
    determining a second stationary posture of the occupant from the measured capacitance values, the second stationary posture taking place during a second stationary period;
    calculating, for the first interdigital capacitive sensor, a first variation between a value representative of the capacitance values measured during the first stationary period and a value representative of the capacitance values measured during the second stationary period;
    calculating, for the second interdigital capacitive sensor, a second variation between a value representative of the capacitance values measured during the first stationary period and a value representative of the capacitance values measured during the second stationary period;
    comparing the first variation to said first range of variation of capacitance values defined for the first interdigital capacitive sensor;
    comparing the second variation to said second range of variation of capacitance values defined for the second interdigital capacitive sensor; and
    if the first variation is within said first range of variation of capacitance values defined for the first interdigital capacitive sensor and if the second variation is within said second range of variation of capacitance values defined for the second interdigital capacitive sensor, generating a detection signal.

2. The method of claim 1, wherein the value representative of the measured capacitance values is the average value of the measured capacitance values.

3. The method of claim 1, wherein determining a first stationary posture comprises:

for each capacitive sensor, calculating a maximum threshold and a minimum threshold based on the capacitance values measured during a previous period, and for each capacitive sensor, comparing the capacitance values measured during a following period with the maximum threshold and with the minimum threshold; if the capacitance values are between the maximum threshold and the minimum threshold for the set of capacitive sensors, for a duration greater than one and a half seconds, then the first stationary posture is determined.

4. The method of claim 3, wherein the maximum threshold and/or the minimum threshold being calculated by adding and/or subtracting at least 2500 picofarads to/from an average value; the average value being calculated from the capacitance values measured during the previous period for each capacitive sensor.

5. The method of claim 1, wherein the second stationary period takes place at least two minutes after the first stationary period.

6. The method of claim 5, wherein the detection signal is generated only if the capacitance values measured during the second stationary period are between the maximum threshold and the minimum threshold for a duration of at least ten seconds.

7. The method of claim 1, further comprising alerting the occupant of the seat by the triggering of a sound, of a display, or a generation of a vibration.

8. The method of claim 1, wherein the seat comprises a seating portion and a backrest hinged to the seating portion about an axis extending in a transverse direction, and wherein the movement of the trunk of the occupant is a rotational movement about an axis parallel to the transverse axis.

9. The method of claim 1, wherein the generated detection signal is representative of at least one position of the occupant among the rotation of part of the trunk of the occupant, a rotation of the chest of the occupant, and a rotation of the pelvis of the occupant, and wherein the method further comprises a step of transmitting the detection signal to a device for managing the triggering of an airbag, the device being able to manage the triggering of the airbag according to the position of the occupant.

10. The method of claim 3, wherein the maximum threshold and/or the minimum threshold being calculated by adding and/or subtracting at least 3000 picofarads to/from an average value; the average value being calculated from the capacitance values measured during the previous period for each capacitive sensor.

11. The method of claim 1, wherein the second stationary period takes place at least three minutes after the first stationary period.

12. A method for detecting a rotation of at least part of the trunk of an occupant seated on a seat of a vehicle, the method being implemented by a detection system comprising the seat, at least a first interdigital capacitive sensor and a second interdigital capacitive sensor carried by the seat, and a controller connected to the first interdigital capacitive sensor and the second interdigital capacitive sensor, said controller comprising a memory containing at least a first range of variation of capacitance values that is defined for the first interdigital capacitive sensor and a second range of variation of capacitance values that is defined for the second interdigital capacitive sensor; the method comprising:

triggering a measurement phase comprising periods during which capacitance values are measured by the first interdigital capacitive sensor and the second capacitive sensor;

the method further comprising, during the measurement phase successively determining a first stationary posture of the occupant from the measured capacitance values, the first stationary posture taking place during a first stationary period, determining a movement of at least part of the trunk of the occupant from the measured capacitance values, and determining a second stationary posture of the occupant from the measured capacitance values;

calculating, for the first interdigital capacitive sensor, a first variation between a value representative of the capacitance values measured during the first stationary period and a value representative of the capacitance values measured during the second stationary period calculating, for the second interdigital capacitive sensor, a second variation between a value representative of the capacitance values measured during the first stationary period and a value representative of the capacitance values measured during the second stationary period;

comparing the first variation to said first range of variation of capacitance values defined for the first interdigital capacitive sensor;

comparing the second variation to said second range of variation of capacitance values defined for the second interdigital capacitive sensor; and if the first variation is within said first range of variation of capacitance values defined for the first interdigital capacitive sensor and if the second variation is within said second range of variation of capacitance values defined for the second interdigital capacitive sensor, generating a detection signal, wherein determining a first stationary posture comprises:

for each capacitive sensor, calculating a maximum threshold and a minimum threshold based on the capacitance values measured during a previous period, and for each capacitive sensor, comparing the capacitance values measured during a following period with the maximum threshold and with the minimum threshold; if the capacitance values are between the maximum threshold and the minimum threshold for the set of capacitive sensors, for a duration greater than one and a half seconds, then the first stationary posture is determined.

* * * * *